United States Patent
Sindhu et al.

(10) Patent No.: US 7,426,572 B1
(45) Date of Patent: Sep. 16, 2008

(54) NETWORK ROUTER USING EMBEDDED AND EXTERNAL MEMORY BASED ON PACKET DESTINATION

(75) Inventors: Pradeep Sindhu, Los Altos Hills, CA (US); Dennis C. Ferguson, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 948 days.

(21) Appl. No.: 10/004,536

(22) Filed: Oct. 31, 2001

(51) Int. Cl.
*G06F 15/173* (2006.01)
*H04L 12/56* (2006.01)

(52) U.S. Cl. .................. 709/238; 370/412; 370/419
(58) Field of Classification Search ......... 709/238–245, 709/217–219; 712/36; 370/395.1–395.21, 370/412–419; 710/316–317
See application file for complete search history.

(56) References Cited

U.S. PATENT DOCUMENTS

| | | | |
|---|---|---|---|
| 5,008,878 A * | 4/1991 | Ahmadi et al. ............. 370/353 |
| 5,247,626 A * | 9/1993 | Firoozmand ................ 709/212 |
| 5,778,180 A * | 7/1998 | Gentry et al. ............... 709/212 |
| 5,991,817 A | 11/1999 | Rowett et al. |
| 6,246,680 B1 * | 6/2001 | Muller et al. ............... 370/389 |
| 6,366,583 B2 * | 4/2002 | Rowett et al. .............. 709/238 |
| 6,424,658 B1 * | 7/2002 | Mathur ...................... 370/429 |
| 6,460,120 B1 * | 10/2002 | Bass et al. ................. 709/250 |
| 6,633,580 B1 * | 10/2003 | Tørudbakken et al. ...... 370/461 |
| 6,671,277 B1 * | 12/2003 | Sugai et al. ............ 370/395.21 |
| 6,745,246 B1 * | 6/2004 | Erimli et al. .......... 370/395.21 |
| 6,965,615 B1 * | 11/2005 | Kerr et al. .................. 370/474 |

* cited by examiner

*Primary Examiner*—Joseph E Avellino
(74) *Attorney, Agent, or Firm*—Shumaker & Sieffert, P.A.

(57) ABSTRACT

A network router makes use of embedded memory and external memory to handle packet buffering requirements for inbound and outbound packets. In particular, the router incorporates an embedded memory device to buffer first packets. This embedded memory device is used instead of a conventional external memory device, making pins that would otherwise be used to communicate with such an external memory device available for other purposes, such as for communicating with an external memory device that buffers second data packets. As a result, using additional pins allows the router to communicate with the external memory device with increased bandwidth, thereby improving the bandwidth of the router.

31 Claims, 3 Drawing Sheets

NETWORK ROUTER USING EMBEDDED AND EXTERNAL MEMORY BASED ON PACKET DESTINATION

TECHNICAL FIELD

The invention relates to computer networks and, more particularly, to routers used in such networks.

BACKGROUND

A computer network is a collection of interconnected computing devices that can exchange data and share resources. In a packet-based network, such as the Internet, the computing devices communicate data by dividing the data into packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

Conventional routers have been implemented according to a variety of architectures. In one architecture, for example, the router includes a routing engine and a packet forwarding engine. The routing engine maintains routing information representative of a network topology and, based on the routing information, generates forwarding information that associates network destinations with specific interface ports on the router. The routing engine communicates the forwarding information to the packet forwarding engine, which forwards packets between inbound and outbound interfaces in accordance with the forwarding information.

The packet forwarding engine may perform additional functions, including, for example, filtering, sampling, policing, and rate limiting in connection with performing packet forwarding. In some architectures, hardware components for performing these and other functions are implemented using integrated circuits, such as application specific integrated circuits (ASICs), distributed across multiple modules. These modules may include, for example, a system control module, an interface card concentrator, and multiple interface cards directly connected to the interface card concentrator. Distributing the ASICs provides some flexibility by allowing a user to purchase only the components that are needed. In addition, if a component, e.g., one of the ASICs, fails, the router can be serviced relatively inexpensively by replacing only the malfunctioning module.

While the multiple module architecture offers certain advantages in flexibility and serviceability, it also has drawbacks. For example, the system cost of the router can be high. Reducing the number of hardware components used to implement the router would reduce the cost of manufacturing the router, and improve the overall reliability of the router. Furthermore, reducing or eliminating the need for communication between different hardware modules and delays associated with such inter-module communication would streamline operation of the router.

Many conventional routing components are "pin limited" in that the size of the routing chip limits the number of pins that can be used to communicate with external components and, as a result, limits the performance of the router. In addition, most of the pins are typically used to communicate data between the routing component and external memory devices, leaving a relatively small number of pins for communicating with other external components.

SUMMARY

In general, a routing architecture is described that improves bandwidth over conventional routing architectures. The routing architecture described herein utilizes routing components that incorporate one or more embedded memory devices. In particular, the routing components incorporate embedded memory between particular interfaces. Among other advantages, the bandwidth between these interfaces is no longer a direct function of the size of the routing chip, thereby allowing higher bandwidths to be realized without requiring an increase in chip size. Higher bandwidths may also be achieved for those interfaces not making use of embedded memory, due to the increase in the number of available pins. There is also an increase in the number of pins available for communicating with other external components.

Consistent with the principles of the invention, the routing component makes use of embedded memory or external memory according to characteristics of the various interfaces of the routing component. The routing component may, for example, communicate data packets using a relatively slow interface, such as a wide area network (WAN) interface, as well as a relatively fast interface, e.g., a switch fabric. Packet congestion occurs less often with the faster interface, and, as a result, data buffering requirements may be lower for the faster interface relative to the slower interface. The routing component takes advantage of the reduced data buffering requirements by using an embedded memory device, e.g., an embedded dynamic random access memory (DRAM) device, rather than an external memory device to buffer packets that are communicated using the faster interface.

In other words, the routing component meets the reduced buffering requirements with an embedded memory device, which typically has less storage capacity than external memory devices. Because the memory device is embedded within the routing component, the bandwidth of data paths to and from the memory device does not require external pins, and therefore is not limited by the number of pins the routing component can support. In addition, pins that might otherwise be used to communicate with an external memory device are thus made available for other uses, such as communicating with another external memory device used for buffering packets that are communicated using the slower interface. As a result, packets can be communicated with this external memory device with improved bandwidth, and the bandwidth of the data paths to the external memory devices may similarly be improved.

In one embodiment, a router includes a first interface module to communicate data with a first network interface and a second interface module to communicate data with a second network interface. The data rates of each interface may not be identical. The router also includes an embedded memory arrangement to buffer data communicated with the second network interface and an interface to a memory external to the router for buffering data communicated with the first network interface.

Another embodiment is directed to a system that includes a first network interface to communicate data with a network and a second network interface to communicate data with the network. A router has an embedded memory to store data communicated using the second network interface. Some embodiments may incorporate multiple routers each having an embedded memory.

The invention may also be implemented as an integrated circuit (IC), such as an application specific integrated circuit (ASIC) or custom chip, that includes a first interface to communicate data with a network and a second interface to communicate data with the network. The IC also incorporates an embedded memory to buffer data communicated using the second interface and an external memory interface to a memory external to the IC for buffering data communicated using the first interface. The IC may be implemented as part of a router. Such a router may be incorporated into a router arrangement using a crossbar.

In addition, the invention may be implemented as a method for communicating data using a network router. This method includes receiving data from a first network interface at a first data rate and storing the data in a memory device external to the network router. The router selects a route for transmitting the data using a second network interface at a second data rate greater than the first data rate and stores the data in an embedded memory.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
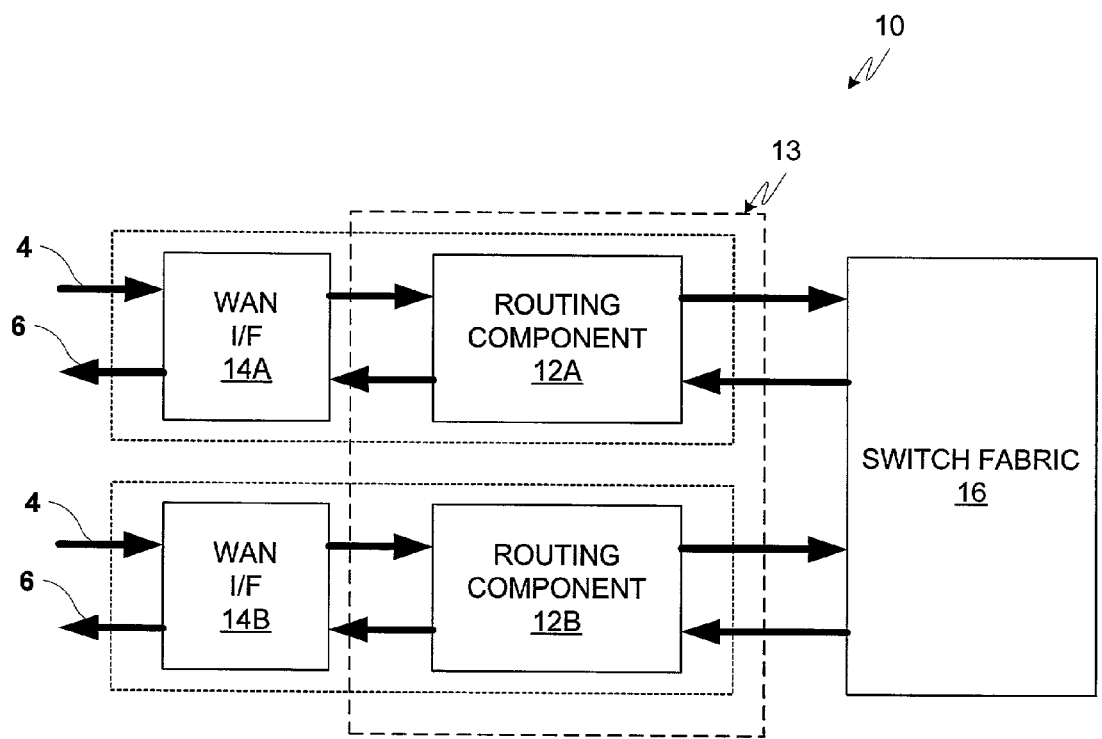
FIG. 1 is a block diagram illustrating an example system configured consistent with the principles of the invention.

FIG. 1 is a block diagram illustrating an example router 10 arranged according to the principles of the invention. Router 10 includes one or more routing components 12A and 12B, collectively referred to as routing element 13. Consistent with the principles of the invention, routing element 13 makes use of embedded memory or external memory according to characteristics of the various interfaces of the routing component. For exemplary purposes, routing element 13 is communicatively coupled to a number of interfaces, including, for example, wide area network (WAN) interfaces 14A and 14B and a switch fabric 16. Routing components 12A and 12B transmit and receive data packets from outbound links 6 and inbound links 4 using their associated WAN interfaces 14A and 14B, respectively. Switch fabric 16 may be implemented as a crossbar that serves as a high-speed interconnection between routing components 12A and 12B. In one embodiment, routing components 12A and 12B are single-chip ASICs that incorporate routing functionality.

Bandwidth associated with WAN interfaces 14A and 14B is relatively expensive, as WAN interfaces 14A and 14B typically communicate data over links 4 and 6 using fiber cables spanning significant distances, e.g., to other cities. By contrast, the bandwidth associated with switch fabric 16 is less expensive because that bandwidth is implemented, for example, using a single crossbar switch internal to router 10. Accordingly, switch fabric 16 typically communicates data with a significantly higher bandwidth than WAN interface 14.

Because the interfaces of routing element 13 have different bandwidths, inbound and outbound packets for one of routing components 12A and 12B may experience different levels of packet congestion in router 10. For example, the bandwidth of switch fabric 16 may be significantly greater than the bandwidth of WAN interface 14. Consequently, routing element 13 uses relatively small, high-speed memory devices to buffer inbound packets communicated from WAN interface 14 to switch fabric 16. Consistent with the principles of the invention, routing components 12A and 12B incorporate embedded memory devices to buffer the inbound packets. The limited buffering requirement allows the memory device to be incorporated into each of routing components 12A and 12B. The embedded storage capacity may be, for example, on the order of 5 milliseconds (ms). That is, the embedded memory device may need sufficient storage capacity to store 5 ms worth of packet data.

Conversely, routing components 12A and 12B use an external memory device to buffer outbound packets communicated from switch fabric 16 to WAN interface 14. This memory device may have a storage capacity of, for example, 100 (ms) or more. The storage capacity may depend on the expected round-trip delay of the network, but is typically large enough to require using a memory device external to the integrated circuits that implement routing components 12A and 12B. As discussed above, routing components 12A and 12B communicate with the external memory device using a number of conductive pins.

In an example embodiment of the invention, multiple routing components may be connected together using a conventional crossbar arrangement to form a scalable router arrangement having a higher bandwidth. Such a scalable router arrangement can also incorporate one or more other routers that may or may not use an embedded memory architecture as described herein.

In the scalable router arrangement, data communicated from a faster interface to a slower interface is stored in an external memory associated with the routing component that received the data. Thus, for example, data received via the crossbar arrangement is buffered in the external memory before being output via a WAN interface. Data communicated from the WAN interface to the crossbar arrangement, on the other hand, is stored in an embedded memory device. Using a conventional switching arrangement (not shown), an interface card can be associated with multiple, redundant network routers. As a result, if one routing component associated with an interface card fails, it can be serviced without disrupting the operation of the interface card by switching to a redundant routing component.

Figure 2:
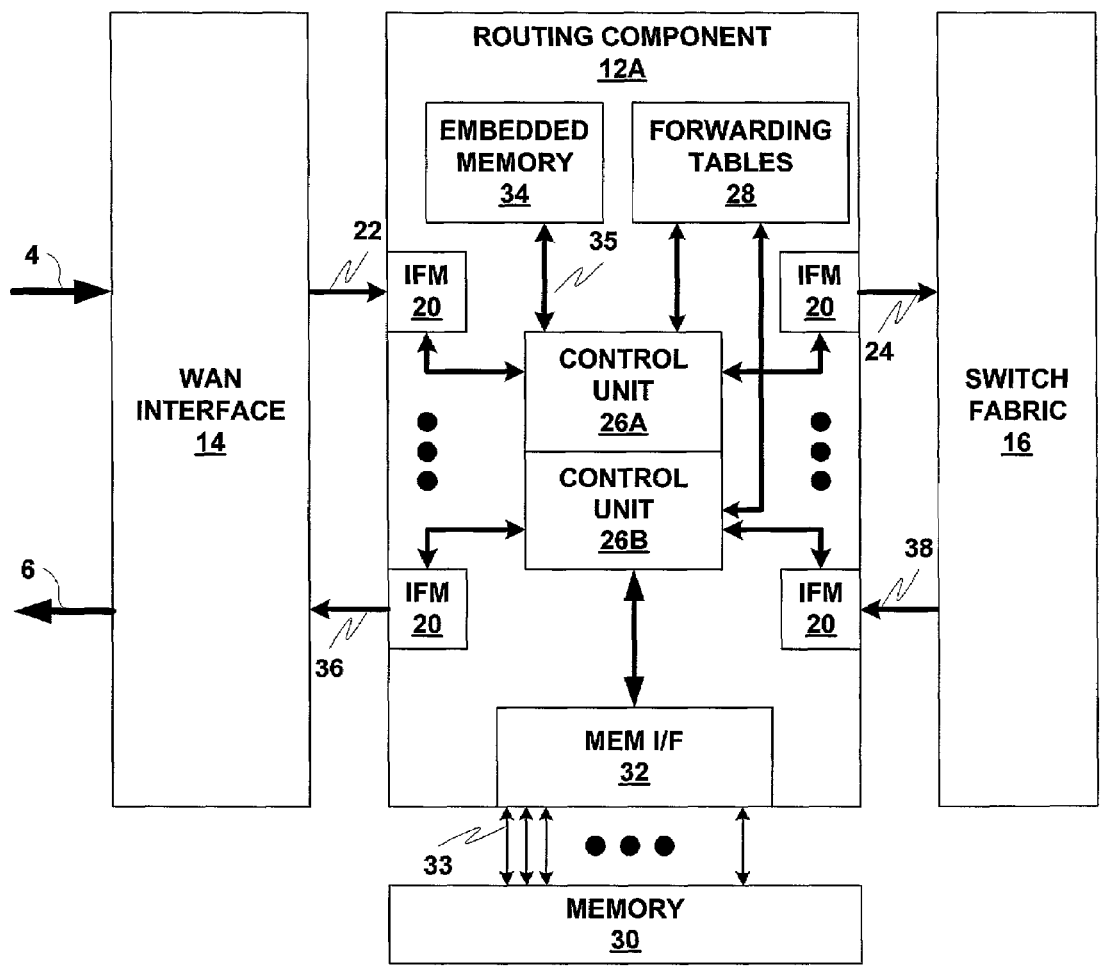
FIG. 2 is a block diagram depicting an example router incorporating an embedded memory architecture consistent with the principles of the invention.

FIG. 2 is a block diagram depicting an example of one of the routing components of FIG. 1, routing component 12A, using an embedded memory architecture consistent with the principles of the invention. Routing component 12A may be implemented, for example, as an ASIC or other integrated circuit (IC), such as a custom chip, that incorporates packet forwarding functionality. Routing component 12A includes one or more interface modules (IFMs) 20. Routing component 12A routes inbound packets received from inbound data path 22 to other routing components (not shown in FIG. 2) via outbound data path 24 and switch fabric 16, and may send the packets back out on an appropriate outbound link 6 via outbound data link 36 and WAN interface 14. Similarly, routing component 12A receives outbound packets from other routing components via inbound data path 38 and switch fabric 16 to be forwarded to WAN interface 14 via outbound data path 36.

Control units 26A and 26B store routing tables 28 received from a routing engine (not shown). Upon receiving an inbound packet, control units 26A and 26B forward the inbound packet to outbound link 6 or another routing component via switch fabric 16. In one embodiment, the functionality of control unit 78 may include a packet forwarding engine (not shown). The forwarding engine may direct inbound packets to outbound link 6 or other routing components via switch fabric 16 for output via WAN interfaces 14. In general, control units 26A and 26B represent any unit that routes packets in accordance with routing tables.

Because switch fabric 16 has a higher bandwidth than WAN interface 14, outbound packets are more likely to experience congestion than inbound packets. Accordingly, control unit 26B uses an external memory device 30 to buffer outbound packets to minimize any adverse effects of congestion. In other words, because of the increased likelihood of congestion, an external memory 30 is used that may have a storage capacity that can accommodate a relatively large amount, e.g., 100 ms, of data. Control unit 26B communicates with external memory device 30 using pins coupled to a memory interface 32 via control lines 33. Memory device 30 may be implemented, for example, using a conventional random access memory (RAM) device, such as a dynamic random access memory (DRAM) or a static random access memory (SRAM). The storage capacity of the RAM device may be selected based on various network characteristics, including, for example, the expected round-trip delay of the network. In some instances, for example, it may be appropriate to use a DRAM device having sufficient storage capacity to buffer 100 ms worth of packet data.

Conversely, inbound packets are substantially less likely to experience congestion than outbound packets. While control unit 26A may still need to buffer packets received from WAN interface 14, the decreased likelihood of congestion results in reduced buffering requirements. Consequently, control unit 26A may use an embedded memory device 34 to buffer these packets. Embedded memory device 34 may be substantially smaller than external memory device 30. For example, in some applications, memory device may only need enough storage capacity to buffer 5 ms of data. Such a memory device need not be implemented using a device external to routing component 12A; rather, the lower storage capacity requirement enables the memory device to be incorporated within the architecture of routing component 12A. According to the principles of the invention, embedded memory device 34 buffers inbound packets that are communicated using switch fabric 16, or another relatively fast interface. In this manner, embedded memory device 34 may be implemented using an embedded DRAM arrangement incorporated into the same integrated circuit used to implement routing component 12A.

Using embedded memory device 34, rather than a second external memory device, to buffer inbound packets eliminates the need to allocate pins to communicate with the second external memory device. Although routing component 12A still uses pins to communicate with external memory device 30, the overall number of pins that must be dedicated to communication with memory devices is reduced as compared to an implementation using two external memories.

The pins that are thereby freed up can be used for other purposes, such as, for example, increasing the bandwidth of routing component 12A. Consistent with the principles of the invention, the bandwidth of routing component 12A may be increased, for example, by allocating these pins to communicate with external memory device 30, thereby increasing the bandwidth of data bus 33. For example, assuming that the number of pins that would otherwise be allocated for communicating with an external memory device with bandwidth B is 2B, i.e., B pins for each direction of communication, using embedded memory device 34 frees up 2B pins that can instead be allocated for communicating with external memory device 30. Allocating additional pins for this purpose increases the bandwidth at which data can be communicated between routing component 12A and external memory device 30, thereby improving the overall bandwidth of routing component 12A. In this example, allocating the additional 2B pins for communicating with external memory device 30 results in an increase of B in the bandwidth between routing component 12A and external memory device 30.

Moreover, because communication between control unit 26 and embedded memory device 34 does not employ pins, control unit 26 can communicate with embedded memory device 34 using an on-chip communication link with a much higher bandwidth, such as a data bus 35. Using a high-speed communication link between control unit 26 and embedded memory device 34 contributes further to improved overall bandwidth of routing component 12A.

Figure 3:
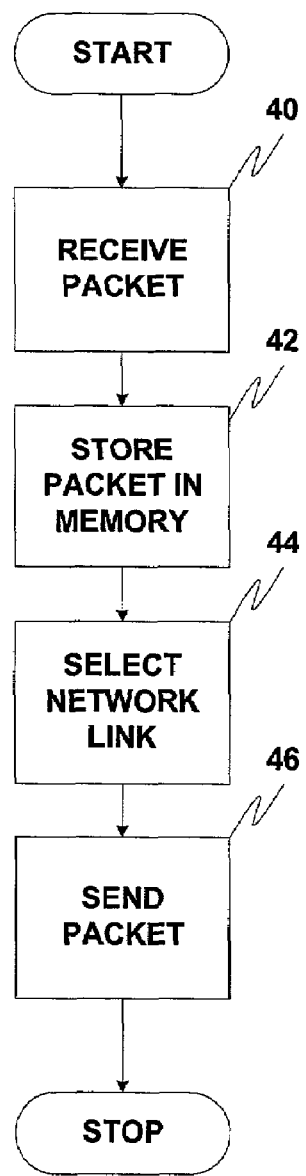
FIG. 3 is a flowchart illustrating an example mode of operation of a router, consistent with the principles of the invention.

FIG. 3 is a flowchart illustrating an example mode of operation of a routing component, such as routing component 12A. Routing component 12 receives a packet (40) from an interface and stores the packet in a memory (42). Whether external or embedded memory is used to buffer the packets depends on the characteristics and architecture of the routing component. To transmit the packet via an outbound network link, routing component 12A selects an outbound network link (44) based on information stored in the forwarding tables. Routing component 12A then transmits the outbound packet using the selected outbound network link (46).

The mode of operation illustrated in FIG. 3 may be employed to communicate packets from switch fabric 16 to WAN interface 14, or vice versa. For example, to communicate a packet from switch fabric 16 to WAN interface 14, routing component 12A first receives the packet from switch fabric 16. Because switch fabric 16 has a higher bandwidth than WAN interface 14, routing component 12A uses external memory device 30 to store the packet. Routing component 12A then transmits the packet via WAN interface 14.

To communicate a packet from WAN interface 14 to switch fabric 16, on the other hand, routing component 12A receives the packet from WAN interface 14. Because switch fabric 16 has a higher bandwidth than WAN interface 14, routing component 12A uses embedded memory device 34 to store the packet. Next, routing component 12A selects an interface to transmit the packet to switch fabric 16 and outputs the packet using the selected interface.

Various embodiments of the invention have been described. The invention uses an embedded memory arrangement to buffer packets communicated using a fast interface, such as a switch fabric, thereby making a greater number of pins available for other purposes. These pins may then be used for other purposes, such as to communicate with an external memory device that buffers data communicated using a slower interface, such as a WAN interface. The bandwidth of communication between the external memory device and the WAN interface may be improved as a result, thereby improving the overall bandwidth of the router. While some embodiments of the invention have been described in the context of a router communicating with a WAN interface and a switch fabric, the invention is not so limited. Rather, these are intended as examples of interfaces. Other types of interfaces may be used, including, in some embodiments, more than two interfaces, each with an associated buffer memory. These and other embodiments are within the scope of the following claims.

The invention claimed is:

1. A routing component of a router comprising:
   a first interface to communicate data with a network;
   a second interface to communicate data to a second routing component using a switch internal to the router, wherein the first interface and the second interface are integrated within a single integrated circuit;
   an embedded memory within the integrated circuit;
   a memory interface to couple the integrated circuit to an external memory; and
   at least one control unit that receives data from the network via the first interface and accesses a forwarding table to determine a network destination for the data received from the network;
   wherein the control unit buffers the data from the network using the embedded memory internal to the integrated circuit when the destination for the data from the network requires forwarding the data to the second routing component of the router as inbound data using the switch, and
   wherein the control unit buffers the data from the network in the external memory when the destination for the data from the network requires forwarding the data received from the network back to the network as outbound data via the first interface.

2. The routing component of claim 1, wherein the at least one control unit comprises:
   a first control unit to buffer in the embedded memory the data that is received from network via the first interface and forwarded to the second interface; and
   a second control unit to buffer in the external memory the data that is received from the second interface and forwarded to the first interface.

3. The routing component of claim 2, wherein the external memory has a greater storage capacity than the embedded memory.

4. The routing component of claim 1, wherein the first interface comprises a wide area network (WAN) interface.

5. The routing component of claim 1, wherein the second interface comprises a switch fabric interface.

6. The routing component of claim 5, wherein the switch fabric interface communicates crossbar data.

7. The routing component of claim 1, wherein the routing component is implemented using a single application specific integrated circuit (ASIC).

8. The routing component of claim 1, wherein the embedded memory comprises a random access memory (RAM).

9. A network element comprising:
   a first network interface to communicate data with a network;
   a second network interface to communicate data with the network;
   a routing component formed in an integrated circuit, wherein the routing component has an embedded memory within the integrated circuit; and
   a second memory external to the routing component,
   wherein the routing component receives data from the network via the first network interface and accesses a forwarding table to determine a network destination for the data,
   wherein the routing component buffers the data from the network in the embedded memory internal to the routing component when the destination requires forwarding the data as inbound data to a second routing component using a switch internal to the network element, and
   wherein the routing component buffers the data from the network in the second memory external to the routing component when the destination requires forwarding the data from the network back to the network as outbound data via the first network interface.

10. The network element of claim 9, wherein the second memory has a greater storage capacity than the embedded memory.

11. The network element of claim 9, wherein the first network interface and the second network interface comprise wide area network (WAN) interfaces.

12. The network element of claim 9, further comprising a crossbar switch fabric coupling the routing component to a second routing component.

13. The network element of claim 12, wherein the switch fabric communicates crossbar data.

14. The network element of claim 9, wherein the routing component is implemented using an application specific integrated circuit (ASIC).

15. The network element of claim 9, wherein the embedded memory comprises a random access memory (RAM).

16. The network element of claim 9, wherein the second routing component includes an embedded memory to store data communicated using the second network interface.

17. An integrated circuit (IC) comprising:
   a first interface to communicate data with a network at a first data rate;
   a second interface to communicate data with a switch fabric at a second data rate higher than the first data rate;
   an embedded memory internal to the IC;
   an interface to a memory external to the IC; and
   at least one control unit that receives data from the network via the first interface and accesses a forwarding table to determine a network destination for the data,
   wherein the control unit buffers the data from the network in the embedded memory internal to the integrated circuit when the destination for the data from the network requires forwarding the data as inbound data using the switch fabric, and
   wherein the control unit buffers the data from the network using the external memory when the destination requires forwarding the data from the network out to the network as outbound data via the first interface.

18. The IC of claim 17, wherein the memory external to the IC has a greater storage capacity than the embedded memory.

19. The IC of claim 17, wherein the first interface is coupled to a wide area network (WAN) interface.

20. The IC of claim 17, wherein the switch fabric comprises a crossbar.

21. The IC of claim 17, wherein the embedded memory comprises a random access memory (RAM).

22. A router comprising:
   an integrated circuit (IC) comprising;
      a first interface to communicate data with a network;
      a second interface to communicate data with a switch fabric internal to the router;
      an embedded memory; and
      an interface to a memory external to the IC; and
   at least one control unit that receives data from the network via the first interface and accesses a forwarding table to determine a network destination for the data,
   wherein the control unit buffers the data from the network using the embedded memory internal to the integrated circuit when the destination requires forwarding the data to a routing component of the router using the switch fabric, and
   wherein the control unit buffers the data from the network in the external memory when the destination requires forwarding the data to the network via the first interface.

23. The router of claim 22, wherein the memory external to the IC has a greater storage capacity than the embedded memory.

24. The router of claim 22, wherein the first interface is coupled to a wide area network (WAN) interface.

25. The router of claim 22, wherein the switch fabric comprises a crossbar.

26. The router of claim 22, wherein the embedded memory comprises a random access memory (RAM).

27. A method for communicating data using a network router, the method comprising:
   receiving inbound data from a network interface via a first routing component;
   accessing a forwarding table with a control unit of the network router to determine a network destination for the data from the network interface;
   when the destination for the data received from the network interface requires forwarding the data from the network interface to a second routing component internal to the router using a switch having a higher bandwidth than the network interface, buffering the data from the network interface as inbound data within an embedded memory internal to the first routing component and forwarding the inbound data from the first routing component to a second routing component via the switch; and
   when the destination for the data received from the network interface requires forwarding the data back to the network interface as outbound data, buffering the outbound data within a memory external to the first routing component and forwarding the outbound data from the first routing component to the network interface.

28. The method of claim 27, wherein the external memory has a greater storage capacity than the embedded memory.

29. The method of claim 27, wherein the first network interface comprises a wide area network (WAN) interface.

30. The method of claim 27, wherein the switch communicates crossbar data.

31. A routing arrangement comprising:
   a crossbar arrangement;
   a plurality of routing components coupled to the crossbar arrangement, at least a first one of the routing components comprising:
      a first interface to communicate data with a network;
      a second interface to communicate data with the crossbar arrangement;
      an embedded memory;
      an external memory interface to a memory external to the routing component; and
      at least one control unit that receives data from the first interface and determines a network destination for the data,
   wherein the control unit buffers the data from the first interface using the embedded memory internal to the routing component when the destination requires forwarding the data as inbound data to a second one of the routing components using the crossbar arrangement, and
   wherein the control unit buffers the data from the first interface in the external memory when the destination requires forwarding the data as outbound data to the network via the first interface.

* * * * *